April 26, 1955 J. H. ORR 2,707,129
COLLAPSIBLE VEHICLE TOP OR HEAD WITH DRAINAGE GUTTER
Filed July 25, 1952
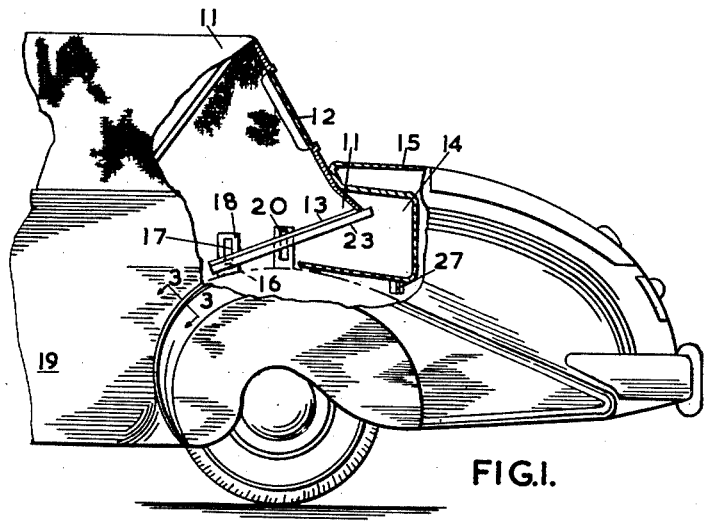
FIG. I.
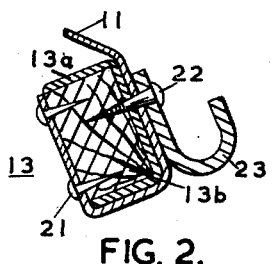
FIG. 2.
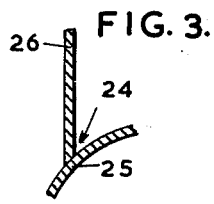
FIG. 3.
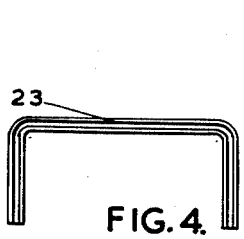
FIG. 4.
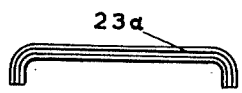
FIG. 5.
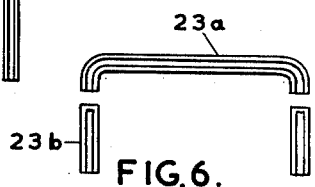
FIG. 6.

United States Patent Office 2,707,129
Patented Apr. 26, 1955

2,707,129

COLLAPSIBLE VEHICLE TOP OR HEAD WITH DRAINAGE GUTTER

John Hewitt Orr, Coventry, England, assignor to Carbodies Limited, Coventry, England Application July 25, 1952, Serial No. 300,804

Claims priority, application Great Britain September 15, 1951

1 Claim. (Cl. 296—107)

The invention relates to an open-type motor-car body of the kind having a head, with a flexible covering, which can be folded to lie in a stowage compartment at the rear and sides of the body, the covering, at least at the back, extending into the top of the compartment without there being a complete weather seal with the upper edge of the compartment when the head is erected, and the bottom edge of the covering being secured to a movable member within the compartment in accordance with Specification Serial No. 300,803, filed July 25, 1952. Due to there being no complete weather seal between the covering and the upper edge of the body it is possible for rain to run down the outside of the head when erected and into the compartment, and the object of the invention is to prevent the rain which enters the compartment in this way from doing damage.

According to the invention the portion of the covering which is within the stowage compartment when the head is erected has, on its outer side (i. e., as regards the passenger space), a gutter for collecting rain water flowing down the outside of the head into the compartment, the gutter being connected to a means for discharging the rain, thus collected, to the outside of the body.

If the head has portions of the flexible covering at the sides of the body extending, without being sealingly connected to the upper edge of the latter, into corresponding side portions of the compartment, the said side portions of the covering can also be provided with gutter portions for draining away the rain water collected, and these said gutter portions can decline forwardly at a greater angle than that at which the motor-car, during normal use, will be inclined. Thus, the side gutter portions could have a declination of one in two, that being an angle which is greater than the inclination of a hill normally to be negotiated by the motor-car.

The gutter at the back of the covering can be made so as to be lowest at its ends whereby to facilitate disposing of the collected rain water through drainage ducts at the sides of the body. Alternatively, when side gutter portions are also used, these can be connected to the ends of the rear one so as to receive the drainage therefrom and be arranged for their front ends to discharge through existing drainage holes in the motor-car body.

In the drawings, which show, by way of example, the application of the invention to a head according to the said specification:

Figure 1 is a side elevation, partly in section, of the rear of a motor-car having a collapsible head equipped with drainage means according to the invention;

Figure 2 is a vertical section to a larger scale through the bottom edge of the head at the rear;

Figure 3 is a section, to the larger scale, on the line 3—3 of Figure 1;

Figure 4 is a plan view, to a smaller scale than Figure 1, of the gutter shown therein; and Figures 5 and 6 are plan views of alternative forms of gutters.

Referring to the drawings the rear and at least the adjacent side portions of the covering 11, which incorporates a rear light 12, is secured at its bottom edge to a U-shaped (in plan) member 13 which is within a stowage compartment 14 of the body 15. The arms of the member 13, as described in the said specification, have pins 16 working in slots 17 of brackets 18 fast with the body 19, and they also have pins working in slotted brackets 20 which are also fast with the body, the arrangement being such that the member 13 can partake of a tilting movement during raising and lowering of the head.

As shown by Figure 2 the member 13 comprises a metal channel-section member 13a in which is secured a wooden insert 13b to which the covering 11 is secured as by nails 21 after having been passed under the member 13a. The construction as thus far described does not form part of the invention.

On the outside of the covering there is secured to the members 13a and 13b, as by screws 22, a gutter 23 which, in the example shown in Figures 1 and 4, extends across the back of the head and part way round the sides. The gutter is U-shaped in plan and its arms decline forwardly, having the front ends open, whereby any rain running down the covering and passing into the stowage compartment 14 will be led away. The forward ends of the gutter can deliver into a channel 24 defined within the body by a portion of the wheel arch 25 and a panel 26 of the body, and this channel can deliver through normal drainage ducts (not shown) leading out of the car into the roadway. When the head is stowed in the compartment 14 the fronts of the member 13 and gutter 23 are up-tilted, and any water on the exterior of the covering (e. g., due to a previous rain storm) which overflows the gutter into the compartment can pass out of a drain connection 27 (see Figure 1) into a rearward extension of the channel 24 and leave the car through other normal drainage ducts (also not shown).

In Figure 5 there is shown a gutter 23a which extends only across the back of the head for delivering collected water into the channel 24 whereas in Figure 6 there are additionally shown separate side gutter portions 23b, closed at their rear ends, for similarly delivering into the channel 24.

What I claim as my invention and desire to secure by Letters Patent of the United States is:

An open-type motor-car body having a head comprising a foldable frame with a flexible covering, said frame pivoted to the body for movement between an erected position and a position in which the head is folded and stowed in a compartment at the rear and sides of the body, a rigid movable member which is U-shaped in plan within and below the top of said compartment and with the arms of the U directed forwardly, said rigid movable member supported by its said arms from said body, a connection between the bottom edge at the rear and sides of said covering and said rigid movable member, means limiting upward movement of said rigid movable member when said head is erected whereby to tension said covering, said rigid movable member being free to fall to a lower position in said compartment during stowing of the head whereby to make room for said foldable frame, said covering when the head is erected not effecting a seal with the outer upper edge of said compartment, and gutter means made fast with said U-shaped member on the outer side of the rear and sides of said covering, said gutter means being for collecting and disposing of rain water flowing down the outside of the head and into the compartment when said head is erected.

References Cited in the file of this patent

UNITED STATES PATENTS

| 1,809,505 | Campbell | June 9, 1931 |
| 1,940,444 | Burgman | Dec. 19, 1933 |
| 2,549,153 | Ackermans | Apr. 17, 1951 |
| 2,569,724 | Mackie et al. | Oct. 2, 1951 |
| 2,623,779 | Catell | Dec. 30, 1952 |

FOREIGN PATENTS

| 447,641 | Great Britain | May 22, 1936 |